(12) United States Patent
Weinrib et al.

(10) Patent No.: US 12,111,931 B2
(45) Date of Patent: Oct. 8, 2024

(54) COUNTERMEASURE AGAINST FAULT INJECTION ATTACKS

(71) Applicant: TEXAS INSTRUMENTS INCORPORATED, Dallas, TX (US)

(72) Inventors: Uri Weinrib, Mazkeret Batya (IL); Barak Cherches, Ramat Ha'Kovesh (IL); Clive David Bittlestone, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 287 days.

(21) Appl. No.: 17/853,612

(22) Filed: Jun. 29, 2022

(65) Prior Publication Data

US 2023/0214490 A1 Jul. 6, 2023

Related U.S. Application Data

(60) Provisional application No. 63/296,297, filed on Jan. 4, 2022.

(51) Int. Cl.
*G06F 13/24* (2006.01)
*G06F 21/52* (2013.01)
*G06F 21/56* (2013.01)

(52) U.S. Cl.
CPC ............ *G06F 21/566* (2013.01); *G06F 21/52* (2013.01); *G06F 2221/034* (2013.01)

(58) Field of Classification Search
None
See application file for complete search history.

(56) References Cited

U.S. PATENT DOCUMENTS

2003/0046464 A1* 3/2003 Murty .................. G06F 9/4812
710/260
2010/0332909 A1 12/2010 Larson
(Continued)

OTHER PUBLICATIONS

Hagai, B., et al., "The Sorcerers Apprentice Guide to Fault Attacks," https://web.archive.org/web/20041016071838/eprint.iacr.org/2004/100; May 7, 2004,—13 pages.
(Continued)

*Primary Examiner* — Henry Tsai
*Assistant Examiner* — Dean Phan
(74) *Attorney, Agent, or Firm* — Xianghui Huang; Frank D. Cimino

(57) ABSTRACT

A method includes programming first and second values and a first compare enable command into respective first operand, second operand, and first compare enable command registers in a hardware comparator circuit. The method includes determining that a first match exists corresponding to the first and second values, programming a third value into the first operand register and a fourth value into the second operand register, and programming a second compare enable command into a second compare enable command register in the hardware comparator circuit. In response to a determination that a second match exists corresponding to the third and fourth values, the method includes asserting a success interrupt signal, programming a fifth value into the first operand register and a sixth value into the second operand register and programming a second compare enable command into a second compare enable command register in the hardware comparator circuit.

20 Claims, 3 Drawing Sheets

(56) References Cited

U.S. PATENT DOCUMENTS

| | | | |
|---|---|---|---|
| 2011/0085386 A1* | 4/2011 | Chou | G11C 16/0475 |
| | | | 365/185.24 |
| 2016/0357172 A1 | 12/2016 | Brabender | |
| 2018/0337607 A1* | 11/2018 | Drda | H02M 1/08 |
| 2021/0089309 A1* | 3/2021 | Liu | G06F 9/30018 |

OTHER PUBLICATIONS

International Search Report dated May 4, 2023, PCT Application No. PCT/US2023/010021, 3 pages.
Written Opinion dated May 4, 2023, PCT Application No. PCT/US2023/010021, 3 pages.

* cited by examiner

COUNTERMEASURE AGAINST FAULT INJECTION ATTACKS

BACKGROUND

Fault injection attacks are tools that allow attackers to access resources in a device (e.g., memory, interfaces, etc.). Attackers may obtain unauthorized access to resources by causing unpredictable system behavior and security breaches. Some techniques for injecting faults into a system may include voltage glitching injections, clock glitching injections, and electromagnetic fault injections (EMFIs). Fault injection attacks may cause instructions to be corrupted, instructions to be skipped during execution, arguments for instructions to be corrupted, improper execution flow, etc. For example, a fault injection attack may cause an authentication mechanism intended to protect access to a particular resource to be bypassed thereby exposing access to the resource. While some software coding practices may improve the overall security to protect access to resources, such practices may not provide strong enough resilience against well-synchronized fault injection attacks.

SUMMARY

In one example, a method includes programming first and second values and a first compare enable command into respective first operand, second operand, and first compare enable command registers in a hardware comparator circuit. The method includes determining that a first match exists corresponding to the first and second values, programming a third value into the first operand register and a fourth value into the second operand register, and programming a second compare enable command into a second compare enable command register in the hardware comparator circuit. In response to a determination that a second match exists corresponding to the third and fourth values, the method includes asserting a success interrupt signal, programming a fifth value into the first operand register and a sixth value into the second operand register and programming a second compare enable command into a second compare enable command register in the hardware comparator circuit.

In another example, an integrated circuit (IC) includes a computer resource, a hardware comparator circuit, and a microcontroller unit (MCU) coupled to the hardware comparator circuit. The hardware comparator circuit includes a first operand register, a second operand register, first compare enable command register, a second compare enable command register, a third compare enable command register, and a scratchpad register. The MCU is configured to write first value into the first operand register, a second value into the second operand register, a first compare enable command into the first compare enable command register, and a scratchpad value into the scratchpad register, the scratchpad value identifying the computer resource. The MCU is further configured to determine that a first match exists corresponding to the first and second values, write a third value into the first operand register and a fourth value into the second operand register and write a second compare enable command into the second compare enable command register. In response to a receipt of a success interrupt signal from the hardware comparator circuit indicating that a second match exists corresponding to the third and fourth values, the MCU is configured to write a fifth value into the first operand register, a sixth value into the second operand register, and a second compare enable command into the second compare enable command register.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

In accordance with conventional software techniques, access to a resource (e.g., memory, interfaces, etc.) may include, for example, the computation of an access parameter such as a digital signature and the comparison of the newly computed access parameter to a previously stored access parameter. If the access parameters match, access to the resource is permitted. If the access parameters do not match, access is to the resource is denied. Relatively few instructions are needed to determine if the access parameters match. For example, most coding languages have some form of an "if-then" instruction in which a condition is checked for "true" or "false." If the condition (e.g., whether the access parameters match) is true, access to the resource is enabled. Such a software instruction can be skipped due to a fault injection attack.

The fault injection countermeasure system described herein separates the functionality of checking a condition necessary to enable access to a resource from the functionality of actually enabling the resource. In one embodiment, one or more comparisons of operands (e.g., access parameters unique to a target resource such as a digital signature, password, etc.) are performed in a hardware comparator which, if the comparisons are successful, triggers a hardware interrupt to complete the process of enabling access to the resource. Additional checks may be performed by an interrupt service (ISR) routine to further ensure an authorized attempt to access the resource is being made.

Figure 1:
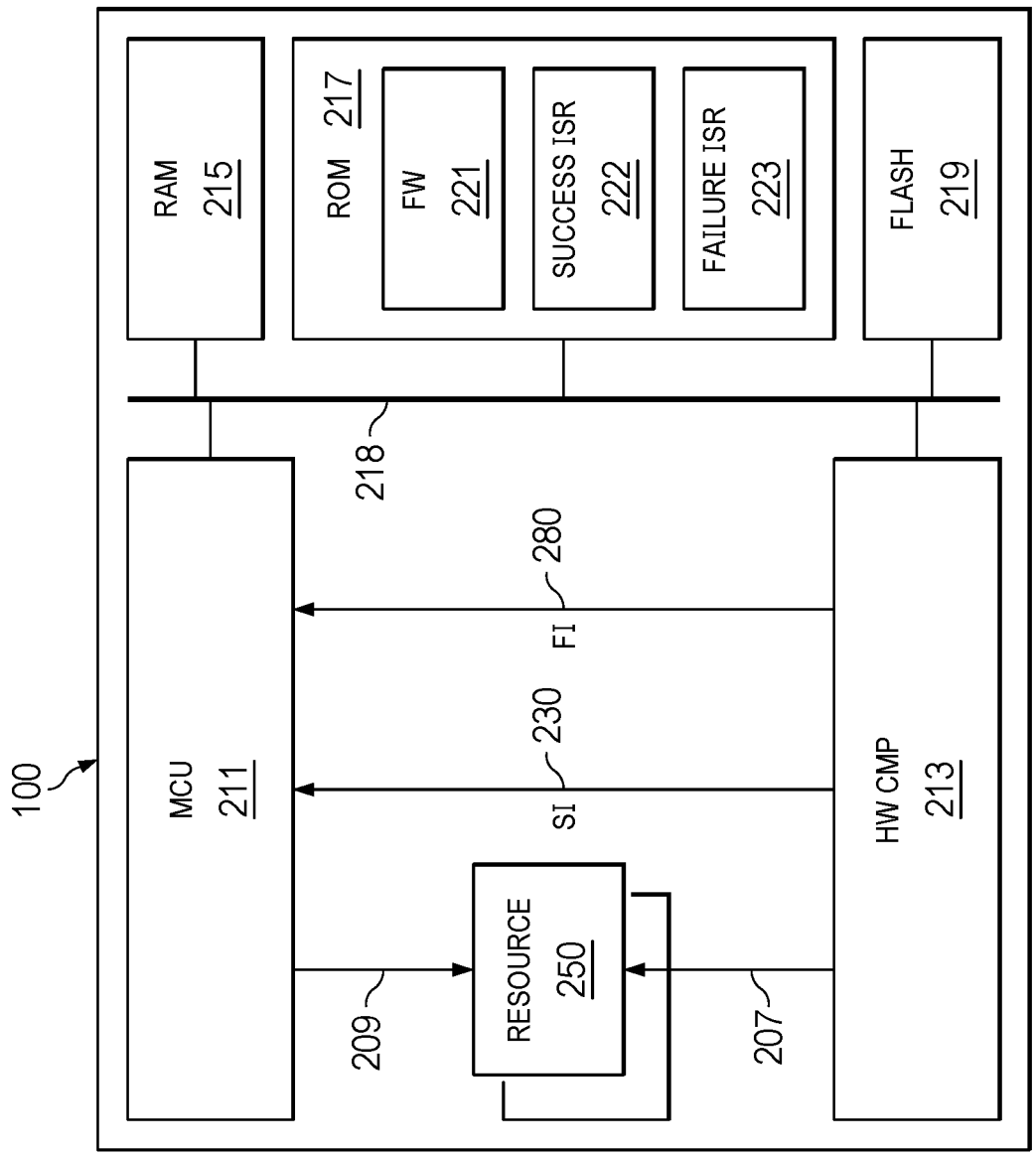
FIG. 1 is a block diagram of a system that implements an improved countermeasure against fault injection attacks, in accordance with one or more embodiments.

FIG. 1 is a block diagram of a system 100 in accordance with one or more embodiments. In one or more embodiments, the system 100 is implemented as an integrated circuit (IC). In one example, the IC is a System-on-Chip (SoC). As shown in the example of FIG. 1, system 100 includes a microcontroller unit (MCU) 211, a hardware comparator circuit (HW CMP) 213, a random-access memory (RAM) 215, a read-only memory (ROM) 217, and a flash memory 219. The MCU 211 is coupled to RAM 215, ROM 217, flash memory 219, and the HW CMP 213 via one or more buses 218.

Executable instructions may be stored in any of the RAM 215, ROM 217, and/or flash memory 219, and may be executed by the MCU 211. In the example shown, firmware 221, a success interrupt service routine (ISR) 222, and a failure ISR 223 are stored in ROM 217. ROM 217 (as well as RAM 215 and flash memory 219) is a non-transitory, computer readable medium. Instructions (e.g., firmware 221, success ISR 222, and failure ISR 223) can be retrieved from the ROM 217 and executed by the MCU 211, as described herein. Any reference herein to the firmware 221, success ISR 222, or failure ISR 223 performing a function includes the MCU 211 performing such function upon execution of the corresponding executing firmware 221, success ISR 222, or failure ISR 223.

The system 100 also includes one or more computer resources 250, whose access is to be restricted to authorized entities only. The computer resources 250 may include interfaces to the system 100 such as a Joint Test Action Group (JTAG) interface, memory (e.g., one or more of RAM 215, ROM 217, and/or flash memory 219 or a subset of their contents), a resource within the MCU 211, etc. As described herein, a combination of the MCU 211 executing firmware and an interrupt service routine (ISR) and the HW CMP 213 is used to enable access to a computer resource 250. In one embodiment, the MCU 211, executing firmware 221, calculates an access parameter such as a digital signature or other type of control value (needed to permit access to a given computer resource) and programs registers in the HW CMP 213 with the newly calculated signature and a pre-stored signature. The HW CMP 213 then performs one or more comparisons of the two signatures (each comparison being performed upon the MCU 211 programming registers in the HW CMP 213). If the signatures match, a success interrupt (SI) 230 is asserted by the HW CMP to the MCU 211, and the MCU 211 responds by executing the success ISR 223 to enable the target computer resource via enable signal 209. In another embodiment, the HW CMP 213 enables the target computer resource via enable signal 207. If any of the comparisons performed by the HW COMP 213 do not match, the HW CMP 213 asserts the FI 280 to the MCU 211, which responds by executing the failure ISR 223. The target computer resource 250 is not enabled in this latter case.

Figure 2:
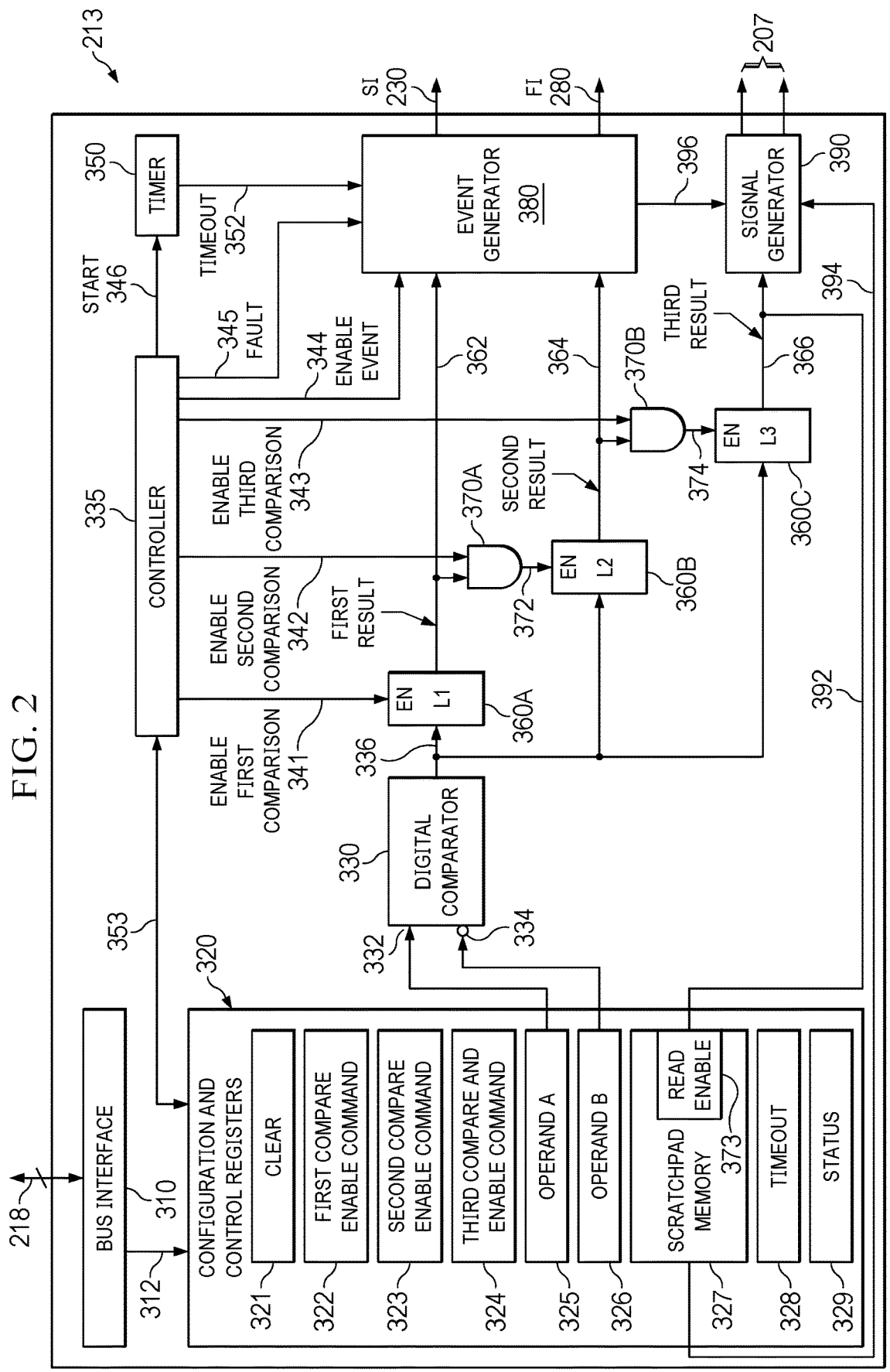
FIG. 2 is a block diagram of hardware comparator circuit usable to provide additional protection against fault injection attacks, in accordance with one or more embodiments.

FIG. 2 is a block diagram of the HW CMP 213, in accordance with an example. In this example, the HW CMP 213 includes a bus interface 310, configuration and control registers 320, a controller 335, a digital comparator 330, a timer 350, latches 360A, 360B, and 360C, AND gates 370A and 370B, an event generator 380, and a signal generator 390. The bus interface 310 provides access via bus 218 between the MCU 211 and the HW CMP 213. Through the bus interface 310, the MCU 211 can write (or read) one or more of the registers within the configuration and control registers 320. The registers include a clear register 321, a first compare enable command register 322, a second compare enable command register 323, a third compare enable command register 324, an operand A register 325, an operand B register 326, a scratchpad register 327, a timeout register 328, and a status register 329. The controller 335 accesses the registers and responds as described below. Signal connection 353 between the controller 335 and the configuration and control registers 320 may include one or more signals. Signal connection 353 may allow the controller 335 to read and/or write one or more of the registers.

The digital comparator 330 is an m-bit comparator and has inputs 332 and 334. The digital comparator compares an m-bit value on input 332 to an m-bit value on input 334. The comparison is a bitwise comparison (e.g., bit 0 of the operand A register 325 is compared to bit 0 of the operand B register 326, bit 1 of register 325 is compared to bit 1 of register 326, and so on). In one embodiment, m is 256 bits, but m can include any suitable number of bits. The digital comparator 330 compares operand A to operand B from registers 325 and 326, respectively, and outputs a comparator output signal 336 accordingly. In one example, comparator output signal 336 is a single digital signal that is asserted logic high if all bits of operand A matches the corresponding bits of operand B; otherwise, the comparator output signal 336 is logic low indicating a mismatch in any one or more bits between operands A and B. In the example of FIG. 2, the bubble on the input 334 indicates that the digital comparator inverts each bit of operand B before comparing the inverse of operand B to operand A. In such an embodiment, the MCU 211 (via firmware 221) writes the operand A register 325 to include an inverse of the value to be compared to the value the MCU writes to the operand B register 326. For example, if the MCU 211 intends for the HW CMP 213 to compare a newly calculated signature to an existing signature, the MCU 211 can invert the bits of the newly calculated signature, write those bits to the operand A register 325, and write the non-inverted bits of the existing signature to the operand B register. Alternatively, the MCU could write non-inverted bits of the newly calculated signature to the operand A register 325, invert the bits of the existing signature, and write those (inverted) bits to the operand B register. In yet other embodiments, the digital comparator 330 does not invert either of its inputs and compares the bits of registers 325 and 326 without performing an inverse operation.

The output of the digital comparator 330 is coupled to an input of latches 360A, 360B, and 360C. Each latch 360A-C has an enable (EN) input. The EN input of latch 360A is controlled by controller 335 (via an enable first comparison signal 341). One input of AND gate 370A is coupled to the output of latch 360A, and the other input of AND gate 370A is coupled to the controller 335 (and receives the enable second comparison signal 342). The output of AND gate 370A is coupled to the EN input of latch 360B. One input of AND gate 370B is coupled to the output of latch 360B, and the other input of AND gate 370B is coupled to the controller 335 (and receives the enable third comparison signal 343). The output of AND gate 370B is coupled to the EN input of latch 360C. As will be described below, a sequence of comparisons of the contents of the operand A and operand B registers is performed with the controller 335 enabling latch 360A, then a first successful comparison of operands A and B being latched by latch 360A thereby enabling latch 360B upon assertion of the enable second comparison signal 342 by controller 335. A second successful comparison of the operand A and B registers is then latched through latch 360B to enable latch 360C upon assertion of the enable third comparison signal 343 by controller 335, which then latches a third successful comparison of the operand A and B registers. Although three latches are shown in the example of FIG. 2, any number of latches can be included.

The event generator 380 receives the first result output signal 362 of latch 360A and the second result output signal 364 of latch 360B. The first and second results should be logic high if operand A matched operand B during each respective comparison by the digital comparator 330. If either or both of the first and second result signals indicate a mismatch, the event generator 380 asserts the FI signal 280 to the MCU 211. If both of the first and second result signals indicate a successful match of operands A and B, the event generator asserts the SI signal 230 to the MCU 211. The MCU 211 executes an ISR (success ISR 222 or the failure ISR 223) corresponding the particular interrupt being asserted. In one embodiment, the controller 335 is implemented as a finite state machine. Accordingly, the states of the controller 335 are pre-defined and each state is only entered from a specific other state and in accordance with pre-defined signaling. If the controller detects any other set of conditions, signals, states, etc., the controller asserts the fault signal 345 to the event generator 380. An asserted fault signal 345 causes the event generator to assert the FI signal 280.

The MCU 211 also can write a time value to the timeout register 328. The time value may be a value that is long enough to allow the MCU 211 to write values to the configuration and control registers 320 (e.g., 10% longer than the needed amount of time to update the registers). If the timer 350 expires before the MCU has fully updated all of the configuration and control registers 320, the timer 350 asserts a timeout signal 352 to the event generator 380, which responds by asserting the failure interrupt 280 the process would be blocked. In some embodiments, the size of the values to be written to the registers is larger than the width of the bus 218. Accordingly, multiple write cycles are performed to fully write values to the configuration and control registers 320. The controller 335 reads the timeout register 328 and programs the timer 350 to begin counting for an amount of time corresponding to the timeout register value. The controller 335 stops the timer 350 upon the completion of the MCU 211 loading a new set of values to the configuration and control registers 320. In one example, the MCU 211 may send a packet to the controller 335 indicating the end of the register update process. In another example, the configuration and control registers 320 assert a signal (a signal within signal connection 353) to the controller 335 indicating the register updates have completed. If the timer 350 expires before the registers 320 are fully updated, the timer asserts the timeout signal 352, which causes the event generator 380 to assert the failure interrupt 280. Assertion of the failure interrupt 280 prevents the target resource 250 from being enabled. Accordingly, the event generator 380 asserts the failure interrupt signal 280 if any of the comparisons of the operands A and B fails, if an aberrant behavior is detected, or if a timeout occurs.

In the example of FIG. 2, the output of latch 360C is the third result signal 366 and is provided to an input of the signal generator 390. The third result signal 366 also asserts a read enable bit (or bits) 373 in the scratchpad 327 to thereby cause the scratchpad 327 to be readable by the MCU 211. Otherwise, the scratch memory register 327 is not readable by the MCU 211, as explained below.

In one embodiment (described below), the MCU responds to an assertion of the SI signal 230 by executing the success ISR 222 which causes the MCU 211 to perform one or more operations before the target computer resource 250 is enabled. If such operations are successful, the MCU 211 assets the enable signal 209 to enable the target computer resource. In another embodiment, the success ISR can again program the registers of the HW CMP 213 to perform yet another comparison of the operands, the success of which results in the signal generator 390 within the HW CMP 213 asserting the enable signal 207 to the target computer resource 250.

The status register 329 can be read by the MCU 211 and provides status information about the operation and status of the HW CMP. In one example, the controller 335 updates the status register 329 with the pass/fail result of each of the operand comparison operations described herein. The clear register 321 can be used to reset the HW CMP to an initial state, including disabling the scratchpad register 327. The MCU 211 can write to the clear register 321 at any point to reset the HW CMP 213. For example, the MCU 211 may write to the clear register 321 to reset the HW CMP 213 after completing the authentication process and enabling the target computer resource 250, so that the scratchpad register 327 is not readable at the beginning of the next process to enable a computer resource 250.

Figure 3:
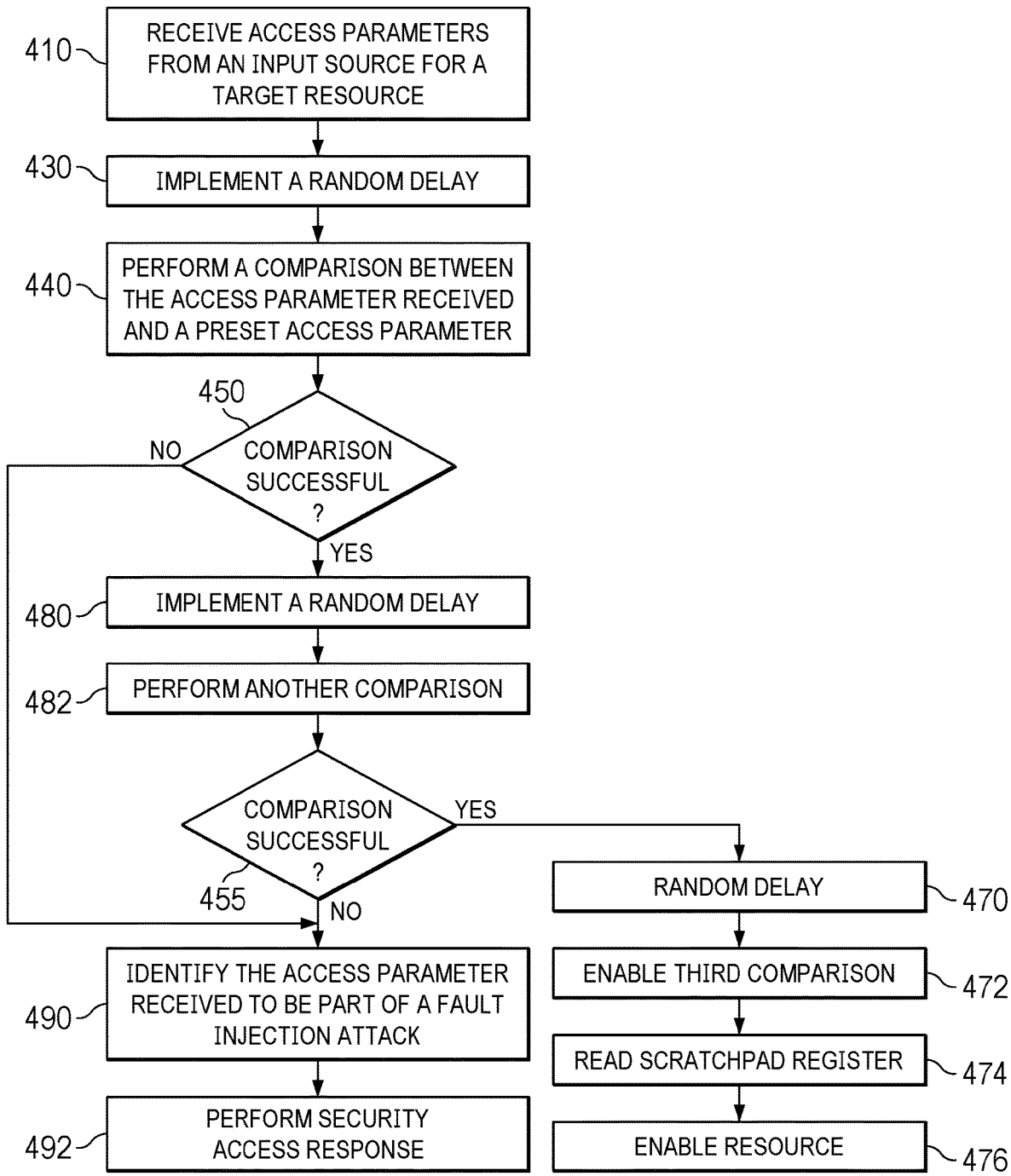
FIG. 3 is a flowchart illustrating a process for reducing the possibility of resource access due to a fault injection attack, in accordance with one or more embodiments.

FIG. 3 depicts a method for enabling access to a target computer resource. At the end of the previous attempt to enable a computer resource 250, the MCU 211 (under execution of firmware) wrote to the clear register 321 in the HW CMP 213, which, in part, updated the read enable capability of the scratchpad register 327 to disallow reading. At that point, the scratchpad register 327 can be written but not read.

At step 410, the method includes receiving an access parameter for a target resource 250 from an input source. The access parameter may be a newly computed digital signature (e.g., computed by the MCU 211), password, PIN, etc. In one embodiment, the access parameter is unique to the target resource. In one embodiment, step 410 is performed by the MCU 211 executing firmware, which is not part of an interrupt service routine.

At 430 the method includes implementing a random (or pseudo-random time) delay. Any suitable software or hardware implemented delay function can be used to implement the random delay. In one example, the delay may be between 10 and 200 milliseconds. The introduction of a random delay at step 430 and at step 480 (described below) helps to minimize the risk of a synchronized fault injection attack from exposing access to the resource.

At 440, the method includes performing a comparison between the received access parameter (from step 410) and a preset access parameter. The preset access parameter may have been previously computed and is a known valid parameter for the target resources. The preset access parameter may be stored in any of the memory devices (RAM 215, ROM 217, and the flash memory 219) and retrieved therefrom by the MCU 211.

In one embodiment, step 440 is performed by the MCU 211 executing firmware, which is not part of an interrupt service routine. In one example, the MCU 211 writes the access parameters the operand registers 325 and 326. For example, the MCU 211 may perform a bitwise inversion of the newly computed access parameter and then write the inverted newly computed access parameter to the operand A register 325. The MCU 211 also may write the preset access parameter (not inverted) to the operand B register 326. As part of step 440, the MCU 211 also may write a value to the first compare enable command register 322 to trigger the controller 335 of the HW CMP 213 to enable latch 360A to latch the results of the first comparison, and also write a value to the scratchpad register 327. The value written to the scratchpad register 327 may identify the target computer resource to be enabled. The MCU 211 may also write a time value to the timeout register 328. At this point, the MCU 211 does not write to the second and third compare enable command registers 323 and 324.

As described above, the controller 335 is implemented as a finite state machine (e.g., a combination of logic gates, counters, flip-flops, etc.) and, at this point in the process flow, the controller 335 is in a state expecting the first compare enable command register to be written so as to enable the first compare operation. If the second or third compare enable command registers are written enabling those respective commands, the controller 335 will respond by asserting the FI signal 280. However, if only the first compare enable command register 322 is written with a value indicating that a compare should be performed, the controller 335 asserts the enable first comparison signal 341 to a logic state (e.g., logic high) to enable latch 360A upon the occurrence of a clock edge to latch 360A (not shown).

The digital comparator 330 compares the values in the operand A and B registers 325 and 326 (inverting the bits of operand B in some embodiments), and outputs a signal 336 indicating whether the comparison was a success or failure (step 450). If all of the corresponding bits match, the digital comparator 330 asserts signal 336 to a first logic state (e.g., logic high), but if any of the corresponding bits do not match, the digital comparator 330 asserts signal 336 to a second logic state (e.g., logic low) to indicate that the operands did not match (the "no" branch).

The "no" branch from decision step 450 results from the comparator's output signal 336 being a logic low state (operand mismatch). In that case, the event generator 380 asserts the FI signal 280 to the MCU 211, and the MCU 211 responds by executing the failure ISR 223 corresponding to the failure event. In the flow chart of FIG. 3, the failure ISR (executed by the MCU 211) performs, for example, steps 490 and 492. In step 490, the failure interrupt service routine identifies the newly calculated access parameter that was received at step 410 as part of a potential fault injection attack. The identified access parameter may be stored in any of the memories in system 100. At step 492, the failure ISR performs a security access response, which may include, for example, sending a message or signal to the input source that initiated the request to access the target resource 250. The message or signal may indicate that, for example, the input source has been listed on a "deny list," which prevents the system 100 from responding to future resource access requests from the same input source. The input source may be identified by any suitable type of identifier such as globally unique identifier (GUID), serial number, internet protocol (IP) address (or other type of address), etc.

However, the operands may have matched as detected by digital comparator 330. The MCU 211 reads the status register 329 which may have been updated by controller 335 to indicate a success of the first comparison operation. Upon the MCU 211 confirming that the first comparison passed (the "yes" branch from decision step 450), the method then includes the MCU 211 implementing a random delay, which may be of the same or different length as the delay at step 430.

At step 482, the method includes performing a comparison between two values. One value may be the received access parameter (from step 410) and the other value may be the preset access parameter (that is, the same two access parameters as were compared in step 440). The values being compared in step 482, however, may be different values than were compared in step 440.

In one embodiment, step 482 is performed by the MCU 211 executing firmware, which is not part of an interrupt service routine. In one example, the MCU 211 writes the values to be compared for the second comparison operation to the operand registers 325 and 326 (e.g., overwriting the access parameters written thereto in step 440). As described above, the MCU 211 may perform a bitwise inversion of the value to be written to the operand A register 325 before writing the inverted value to the register. The MCU 211 also may write the other value (not inverted) to the operand B register 326. As part of step 482, the MCU 211 also may write a value to the second compare enable command register 323 to trigger the controller 335 of the HW CMP 213 to perform the second comparison operation.

At this point in the process flow, the controller 335 is in a state expecting the second compare enable command register to be written so as to enable the second compare operation. If the first or third compare enable command registers are written enabling those respective commands, the controller 335 will respond by asserting the failure interrupt signal 280. However, if only the second compare enable command register 323 is written with a value indicating that a compare should be performed, the controller 335 asserts the enable second comparison signal 342 to a logic state (e.g., logic high) to enable latch 360B via AND gate 370B, as further described below). As described above, the digital comparator 330 compares the values in the operand A and B registers 325 and 326 (inverting the bits of operand B in some embodiments), and outputs a signal 336 indicating whether this second comparison was a success or failure. If all of the corresponding bits match, the digital comparator 330 asserts signal 336 to a first logic state (e.g., logic high), but if any of the corresponding bits do not match, the digital comparator 330 asserts signal 336 to a second logic state (e.g., logic low) to indicate that the operands did not match.

The successful first comparison would have resulted in comparator output signal 336 being a logic 1, which would have been latched through latch 360A in response to an assertion by the controller 335 of the enable first comparison signal 341. In response to the second compare enable command register 323 containing a value indicating the second comparison should be performed, the controller asserts the enable second comparison signal 342. At that point, both inputs to AND gate 370A are logic high, and latch 360B latches the output signal 336 of the digital comparator 330 (which will be a logic 1 if the operands A and B match).

Control passes to step 455 in which the method determines whether the second comparison passed or failed (the first comparison having occurred at decision step 450). If the second comparison failed (e.g., operands A and B did not match), then the event generator 380 asserts the failure interrupt signal 280 and the failure ISR is executed by the MCU 211 (steps 490 and 492, as described above). If the second comparison passed, then the event generator 380 asserts the success interrupt signal 230 to the MCU 211, and the MCU 211 responds by executing the success ISR 222.

In the flow chart of FIG. 3, the success ISR (executed by the MCU 211) in one embodiment performs steps 470-476. At step 470, the success ISR implements a random delay as described above.

At step 472, the success ISR enables a third comparison to be performed. This step may be performed by the success ISR programming the third compare enable command register 324 and the operand A and B registers 325 and 326, as described above. The values programmed into the operand registers may be the same values as in the first and/or second comparison operations, or different values. As described above, one value may be an inverted version of the value. The value written into the third compare enable command register 324 indicates to the controller 335 that the third comparison operation is to be performed. If the first two comparison operations occurred in that order and both comparisons passed, the controller 335 will be in a state expecting the third comparison to be initiated. If the controller 335 is not in that state when the third compare enable command register is written with a value to initiate the comparison, the controller 335 will assert the fault signal 345 to the event generator 380, and the event generator will assert the failure interrupt signal 280 to terminate the success ISR and to instantiate execution of the failure ISR, as described above.

Assuming the first two comparison operations passed, the second result output signal 364 from latch 360B will be logic high. Further, the controller 335 responds to the value written into the third compare enable command register 324 by asserting the enable third comparison signal 343, and thus both inputs to AND gate 370B will be logic high. The latch 360C will then be enabled and the comparator's output signal 336 will be latched by latch 360C as the third result signal 366. The third result signal 366 will be logic high if the two values that were compared by the digital comparator 330 were the same (accounting for the possible inversion as described above). If the two values are different, the third result signal will be logic low.

The third result signal 366 is coupled to a read enable bit 373 within the scratchpad register 327. The scratchpad register 327 was not readable upon the MCU initially clearing the state of the HW CMP 213 before the first comparison was performed. If the third result signal 366 is logic high, the scratchpad register 327 will be read enabled; otherwise the scratchpad register is not read enabled. The third result signal 366 also may be provided as an input to the signal generator 390.

At step 474, the success ISR attempts to read the scratchpad register 327. If the third comparison failed, the scratchpad register will not be readable thereby preventing access to the target resource 250. If the third comparison passed, the scratchpad register 327 will be readable, the success ISR reads the value in the scratchpad register. The value in the scratchpad register 327 may be an identifier of the resource 250 to be enabled. At step 476, the success ISR then enables the target resource, for example, by asserting the corresponding enable signal 209 (FIG. 1).

In an alternative embodiment, rather than the success ISR (MCU 211) reading the scratchpad register 327 and asserting the enable signal 209 to the target resource 250, the success ISR programs the third compare enable command and operand registers 323-326 as described above, and the signal generator 390 within the HW CMP 213 asserts the correct enable signal 207. Multiple enable signals 207 are shown in FIG. 3, and each enable signal enables a different resource. In this embodiment, a logic high assertion (comparison passed) of the third result signal 366, enables the scratchpad register 327 to be read which then causes the value in the scratchpad register to be provided to the signal generator 390. The signal generator 390 then asserts the enable signal 207 corresponding to the value from the scratchpad register.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

Modifications are possible in the described embodiments, and other embodiments are possible, within the scope of the claims.

What is claimed is:

1. A method for providing access to a computer resource, the method comprising:
   programming first and second values and a first compare enable command into respective first operand, second operand, and first compare enable command registers in a hardware comparator circuit;
   determining that a first match exists corresponding to the first and second values;
   programming a third value into the first operand register and a fourth value into the second operand register;
   programming a second compare enable command into a second compare enable command register in the hardware comparator circuit;
   in response to a determination that a second match exists corresponding to the third and fourth values, asserting a success interrupt signal;
   programming, by a success interrupt service routine (ISR), a fifth value into the first operand register and a sixth value into the second operand register; and
   programming, by the success ISR, a second compare enable command into a second compare enable command register in the hardware comparator circuit.

2. The method of claim 1, further comprising programming a scratchpad register in the hardware comparator circuit with a scratchpad value corresponding to the computer resource.

3. The method of claim 2, further comprising, determining that a match exists corresponding to the fifth and sixth values, causing the scratchpad register in the hardware comparator circuit to be readable.

4. The method claim 3, further comprising:
   reading, by the success ISR, the scratchpad value from the scratchpad register; and
   enabling, by the ISR, the computer resource corresponding to the scratchpad value.

5. The method of claim 3, further comprising:
   providing the scratchpad value from the scratchpad register to a signal generator in the hardware comparator circuit; and
   enabling, by the signal generator, the computer resource corresponding to the scratchpad value.

6. The method of claim 1, further comprising asserting a failure interrupt signal by the hardware comparator circuit in response to the second compare enable command being programmed into the second compare enable command register before the first compare enable command is programmed into the first compare enable command register.

7. The method of claim 1, further comprising asserting a failure interrupt by the hardware comparator circuit in response to a determination that the first match does not exist corresponding to the first and second values or that the second match does not exist corresponding to the third and fourth values.

8. The method of claim 1, wherein the hardware comparator circuit enables a comparison to be performed corresponding to the third and fourth values in response to at least the determination that the first match exists.

9. An integrated circuit (IC), comprising:
   a computer resource;
   a hardware comparator circuit including a first operand register, a second operand register, first compare enable command register, a second compare enable command register, a third compare enable command register, and a scratchpad register; and
   a microcontroller unit (MCU) coupled to the hardware comparator circuit, the MCU configured to:

write first value into the first operand register, a second value into the second operand register, a first compare enable command into the first compare enable command register, and a scratchpad value into the scratchpad register, the scratchpad value identifying the computer resource;

determining that a first match exists corresponding to the first and second values;

write a third value into the first operand register and a fourth value into the second operand register;

write a second compare enable command into the second compare enable command register; and in response to a receipt of a success interrupt signal from the hardware comparator circuit indicating that a second match exists corresponding to the third and fourth values, writes a fifth value into the first operand register, a sixth value into the second operand register, and a second compare enable command into the second compare enable command register.

10. The IC of claim 9, wherein, the hardware comparator circuit is configured to enable the scratchpad register to be readable upon detection of the existence of the second match.

11. The IC of claim 10, wherein the MCU is configured to read the scratchpad register and to enable the computer resource based on the scratchpad value.

12. The IC of claim 10, wherein the hardware comparator circuit is configured to enable the computer resource based on the scratchpad value.

13. The IC of claim 9, wherein the MCU is configured to implement a first pseudo-random time value before writing the first value into the first operand register and to implement a second pseudo-random time value before writing the third value into the first operand register.

14. The IC of claim 9, wherein the hardware comparator circuit is configured to assert a failure interrupt signal in response to failure of the first match corresponding to the first and second values or failure of the second match corresponding to the third and fourth values.

15. An integrated circuit (IC), comprising:
a controller;
a digital comparator having a first comparator input, a second comparator input, and a digital comparator output;
a first latch having a first latch input, a first latch output, and a first enable input, the first latch input coupled to the digital comparator output, and the first enable input coupled to the controller;
a first AND gate having a first AND gate input, a second AND gate input, and first AND gate output, the first AND gate input coupled to the first latch output, and the second AND gate input coupled to the controller; and
a second latch having a second latch input, a second latch output, and a second enable input, the second latch input coupled to the digital comparator output, the second enable input coupled to the first AND gate output.

16. The IC of claim 15, further comprising:
a first operand register coupled to the first comparator input; and
a second operand register coupled to the second comparator input.

17. The IC of claim 16, further comprising:
a first compare enable command register coupled to the controller; and
a second compare enable command register coupled to the controller;
wherein the controller is configured to:
enable the first latch in response to a first value from the first compare enable command register; and
assert a signal to the second AND gate input in response to a second value from the second compare enable command register.

18. The IC of claim 16, further comprising an event generator having a first event generator input and a second event generator input, the first event generator input coupled to the first latch output, and the second event generator input coupled to the second latch output.

19. The IC of claim 18, wherein the event generator has a first interrupt signal output and a second interrupt signal output, the event generator configured to:
assert the first interrupt signal output in response to both of the first and second latch outputs being in a first predetermined state; and
assert the second interrupt signal output in response to the first and second latch outputs being in a second predetermined state.

20. The IC of claim 16, further comprising:
a third latch having a third latch input and a third latch output, the third latch input coupled to the digital comparator output; and
a scratchpad register having a read enable input coupled to the third latch output.

* * * * *